3,554,009
METHOD AND DEVICE FOR DETERMINING THE QUANTITY OF DREDGING SPOIL TO BE PAID
Romke van der Veen, Jutphaas, Netherlands, assignor to N.V. Ingenieursbureau voor Systemen en Octrooien "Spanstaal," Rotterdam, Netherlands, a Dutch contracting company
Filed Apr. 21, 1969, Ser. No. 817,691
Claims priority, application Netherlands, Apr. 24, 1968, 6805777
Int. Cl. G01n 15/06, 9/26
U.S. Cl. 73—61
10 Claims

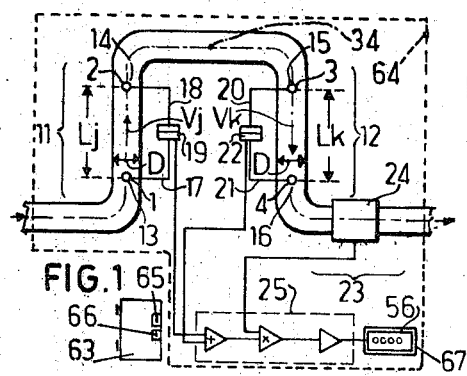
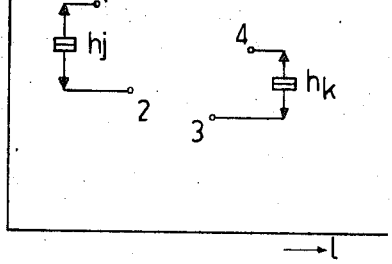
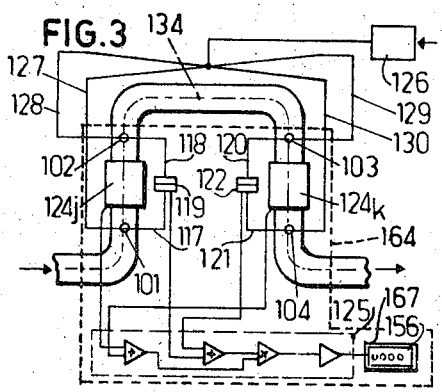
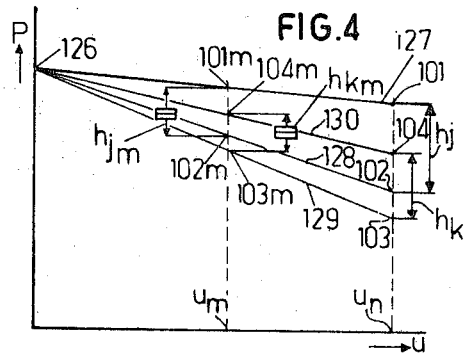
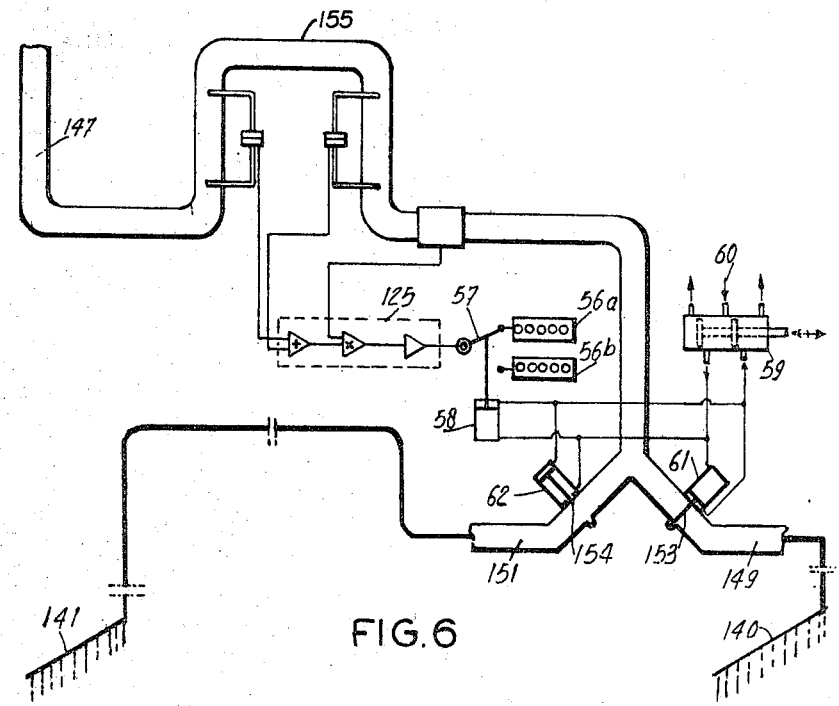
Jan. 12, 1971 — R. VAN DER VEEN — 3,554,009
METHOD AND DEVICE FOR DETERMINING THE QUANTITY OF DREDGING SPOIL TO BE PAID
Filed April 21, 1969 — 2 Sheets-Sheet 1
INVENTOR
ROMKE van der VEEN
BY
ATTORNEY United States Patent Office 3,554,009
Patented Jan. 12, 1971

ABSTRACT OF THE DISCLOSURE

A method and apparatus are disclosed for measuring the quantity of dredging spoil. A flow of the spoil and water is guided vertically upwards along a first flow section and downwards along a second flow section. Pressure differentials between vertically spaced points on each flow section are obtained and added. The product of the pressure differential and flow velocity is integrated during the period in which the dredging spoil is being conveyed.

---

Figure 5:
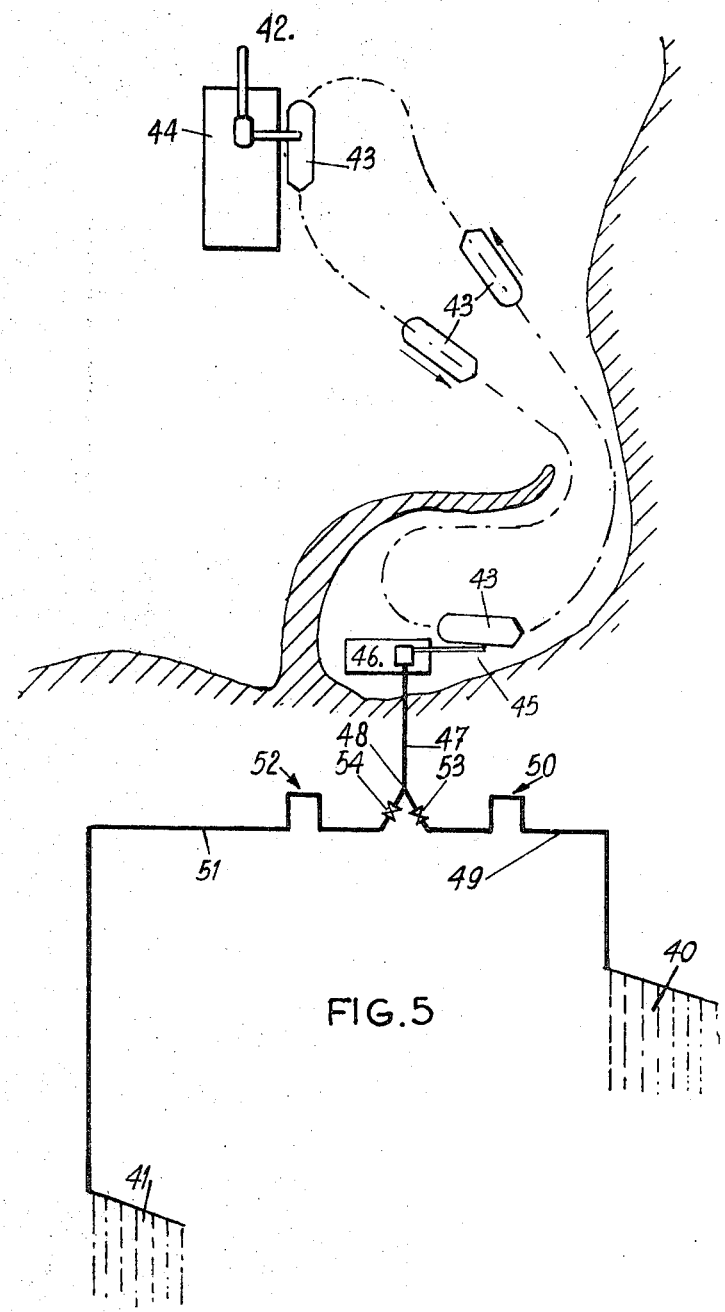

The present invention relates to a method and apparatus for measuring the quantity of dredging spoil or the like.

In most contracted dredging- or raise-work the quantity of digged or displaced material is the basis on which the cost for the work is established, that is the amount of money that is agreed upon in advance based on the volume or weight of the dredging spoil. For such a settlement it is important that the quantity of dredging spoil be measured accurately.

With dredging- or raise-work the conveyed quantity of dredging spoil is determined by means of gaugings in the raised ground, in the dredged water or in the barges which convey the dredging spoil from the winplace to the dischargeplace. Gauging involves much labor and the errors in these measurements are often considerable.

The most important disadvantage of these measuring faults is that they are a result of human error, which can not be calibrated and thus can not be compensated for.

Owing to the intensive and monotonous labor involved in the gauging operation, this work is done by relatively low-skilled and low-salaried persons and the amounts to be paid for this labor are high. In spite of the disadvantages noted above in measuring by gaugings, the payment for this work has been heretofore based upon such gaugings, because there was no more reliable alternative.

The invention relates to a method of determining the quantity of dredging spoil to be paid, in a flow of a suspension of dredging spoil and water during the performance of ground-work.

The invention provides a new method, wherein the flow is guided mainly vertically upwards along a first flow section and mainly vertically downwards along a second flow section.

The concentration of dredging spoil in the suspension is derived from at least one pressure difference between two vertically spaced points of the first flow section and at least one pressure difference between two vertically spaced points of the second flow section. The output of the flow is picked up and wherein the product of the value derived from the at least two mentioned pressure differences and the flow velocity is integrated over the time during which the dredging spoil is conveyed.

Further the invention provides a measuring device for determining the quantity of dredging spoil to be paid, which quantity is conveyed through a pipe during the performance of groundwork, wherein a first pipe fraction conveys the flow mainly vertically upwards and a second pipe fraction conveys the flow mainly vertically downwards.

Measuring points at the top and the bottom of these pipe fractions are each connected to a pressure pick up, and a flow velocity meter measures the flow velocity of the suspension flowing through the pipe. A multiplier multiplies the convey concentration derived from the pressure differences in the two pipe fractions by the flow velocity, and an integrator integrates the product of convey concentration and flow velocity over the convey time.

As a result of the invention the labor intensive work and the large and not compensable measuring errors resulting from gaugings, are significantly reduced. Moreover the measured value, which must only be read from time to time, can now be fixed by a highly skilled and highly salaried employee.

It has been noted that a method and device are known, whereby the convey concentration of dredging spoil of a suspension of dredging spoil and water flowing through a pipe is measured at only one mainly vertically directed fraction of the pipe. Also this known method can be performed easily and with little work. This known method is applied for measuring the convey concentration of dredging spoil of a suspension of dredging spoil and water flowing through a pipe in order to be able to convey the dredging spoil in the most economic way without the risk of stopping of the pipe. The payment of the ground-work cannot be based upon this known method, because by measuring at only one vertically directed pipe fraction essential measuring faults are introduced, as a pressure difference arises in a vertically directed flow of a suspension, which pressure difference does not depend only on the specific gravity of the suspension.

It is very difficult to correct these essential measuring errors, because the corrective factors vary considerably with the various working circumstances. The true corrective factors are often not accurately known. The method according to the invention, on the contrary, is in principle correct, in that the convey concentration is derived from a pressure differential in a first pipe fraction which conveys the flow mainly vertically upwards, and from a pressure differential in a second pipe fraction which conveys the flow mainly vertically downwards. In this way the measuring fault arising in the measuring in the first pipe fraction is compensated exactly by the measuring fault, which arises in the measuring in the second pipe fraction.

In order to prevent the commission of fraud during the measurement, the measuring device is secured during the performance of the ground-work, such as putting the measuring device under the charge of a sworn man or by guards appointed by the contractor and/or the principal. This can also be obtained by placing the measuring device or at least those parts thereof can be fraudulent tampered with or modified in a locked place, which is only accessible by the contractor and the principal together, such as by having this place is locked by means of two different locks, with one of the two different keys for these locks being in the possession of the contractor and the other in the possession of the principal.

The mentioned and other features of the invention will be elucidated in the following description on hand of the drawings, in which:

FIGS. 1 and 3 schematically illustrate pipes for conveying a suspension of dredging spoil and water, which pipes are each provided with a device according to the invention.

FIGS. 2 and 4 are diagrams of the measured pressures at various measuring points of the devices according to the FIGS. 1 and 3 respectively and FIGS. 5 and 6 each illustrate a scheme of two different particular methods according to the invention during the performance at the same time of two ground-works.

The parts corresponding with each other of the represented embodiments according to FIGS. 1 and 5 are provided with the same reference numbers as the embodiments of FIGS. 3 and 6 respectively, with the understanding that the reference-numbers of the parts of the embodiments of FIGS. 3 and 6 are increased by 100.

According to the invention a measuring section is incorporated in a pipe, through which a suspension of dredging spoil and water flows, which measuring section has the shape of a reversed U with vertical legs. A pipe fraction $j$ which conveys the suspension vertically upwards and a pipe fraction $k$ which conveys the suspension vertically downwards are in this manner created.

For measuring the convey concentration of dredging spoil in the suspension, connections 13, 14, 15 and 16 respectively are provided in the measuring section on the indicated measuring points 1, 2, 3 and 4. The connections 13 and 14 are connected by means of conduits 17 and 18 with the opposite sides of a pressure pick up 19 for picking up the difference between the pressure in the fraction $j$ at the measuring point 1 and that at the measuring point 2.

In the same way the connections 15 and 16 are connected by means of conduits 20 and 21 with the opposite sides of a pressure pick up 22 for picking up the difference between the pressure in the fraction $k$ at the measuring point 3 and that at the measuring point 4.

A velocity meter 24 known by itself is provided in a horizontal pipe fraction 23, which may for example, operate works on the basis of an unhomogenous magnetic field.

The measured values of the pressure pick ups 19 and 22 are added and multiplied by the measured value of the velocity meter 24 by means of known summing and multiplying elements contained in a calculating machine generally designated 25.

This product is integrated over the total flow time, in a known integrating element preferably of the electrical type also contained, as shown in FIG. 1, within machine 25, and registrated on a counter 56.

The pressures of the measuring points and the measured pressure differences $h_j$ of the fraction $j$ and $h_k$ of the fraction $k$ are shown in FIG. 2.

For $h_j$ and $h_k$ the following equations are :

$$h_j = L_j(S_j + C_j V_j^2)$$

and $$h_k = L_k(S_k + C_k V_k^2)$$

Where the symbols $L_j$ and $L_k$ the length of the pipe between the measuring points 1 and 2 and that between the measuring points 3 and 4 respectively, $S_j$ and $S_k$ the specific gravity of the suspension in the fractions $j$ and $k$ respectively, $V_j$ and $V_k$ the flow velocity of the suspension in the fractions $j$ and $k$ respectively and $C_j$ and $C_k$ constant values relating to the flow resistance. When the fractions $j$ and $k$ are identical then: $C_j = C_k$. Equal diameters of the fractions $j$ and $k$ give: $V_j = V_k$.

$$h_j/L_j = S_j + C_j \cdot V_j^2$$

$$h_k/L_k = S_k - C_k \cdot V_k^2$$

$$h_j/L_j + h_k/L_k = S_j + S_k$$

When adding up the terms $h_j/L_j$ and $h_k/L_k$ the terms referring to the flow resistances cancel out. The percentage of the volume of dredging spoil in the suspension can be calculated from the specific gravity of the conveyed suspension which is equal to the average of $S_j$ and $S_k$.

It is true that the dredging spoil in the fraction $j$ tends to remain behind relative to the upward flow as a result of its larger specific gravity. This tendency, however, is compensated in the fraction $k$ by the tendency of the dredging spoil to move faster on its downward flow as a result of the larger specific gravity. The volume concentration $C_v$ of dredging spoil in the suspension can be calculated as follows:

$$\tfrac{1}{2}S_j + \tfrac{1}{2}S_k = 1 - C_v + C_v \cdot S_b$$

wherein $S_b$ is the known specific gravity of the dredging spoil without empty spaces, which for example, is equal to 2.65 kg./d.³. Then it follows from this equation:

$$1.65 C_v = (S_j + S_k - 2) \cdot 0.50$$

The weight on dredging spoil per dm.³ suspension, indicated by $$G_b = 2.65 C_v = (S_j + S_k - 2) \cdot 0.805$$

Multiplication of $G_b$ by the number of litres of conveyed suspension per second, gives the production $O_b$ in weight of dredging spoil/second.

$O_b = G_b \cdot A \cdot V_s$, wherein $V_s$ represents the velocity of the suspension measured by means of the velocity meter 24 and wherein A represents the flow surface of the velocity meter 24.

By integration of $O_b$ over the flow time during this time the completely delivered quantity of weight of dredging spoil is obtained.

The measuring points 2 and 3 preferably are arranged at the same level and the measuring section with the junction bends is completely symmetrical. With an interior pipe diameter of 60 cm. the vertical distance between the measuring points 1 and 2 is for example, 4 m. Further determining the average of the values $h_j/L_j$ and $h_k/L_k$ is easier, if $L_j = L_k$.

In order to prevent dredging spoil from clogging the conduits 117, 118, 120 and 121, water is pumped as a purgative into the measuring section by means of a pump 126 through four substantially identical narrow purgative conduits 127, 128, 129 and 130, which conduits are connected to the connections 101, 102, 103 and 104 respectively (see FIG. 3).

The pressure reduction in the purgative conduits is shown in FIG. 4. If the pressures in the purgative conduits are measured on a pipe length $= U_m$ from the pump 126 and the total pipe length from the pump to the connections 101, 102, 103 and 104 is equal to $U_n$, then $h_j = h_{jm} \cdot U_n/U_m$ and $h_k = h_{km} \cdot U_n/U_m$.

For increasing the measuring accuracy the measuring points on the purgative conduits 127–130 are arranged close to the connections 101–104.

The flow velocity of the suspension $V_s$ is preferably determined instead of by one velocity meter 24 in the fraction 23, by means of two velocity meters $124_j$ and $124_k$. With a velocity measurement in a horizontal pipe fraction 23 of FIG. 1 measuring errors can arise, in that dredging spoil may deposit in this fraction, causing the flow diameter to decrease and an incorrect flow velocity is measured. The deposit of dredging spoil is excluded in a vertical fraction. The problem occurs because in an upward flow the water velocity is larger than in the downward flow, because the dredging spoil remains behind relative to the water in the first case and hurries forward relatively to the water in the second case. The measuring errors that may result when picking up $V_j$ and $V_k$ are compensated by taking the average of $V_j$ and $V_k$.

With the method according to the invention the parts of the measuring device, such as the calculating machine and the counting mechanism, which parts may be tampered with or modified by fraudulent dealings, are secured. This mechanism is accessible only by a guard, who is considered reliable by the contractor and the principal. The parts which are so tamperable by fraudulent dealings are preferably placed in one or in a multiple of lockable spaces which are each sealed by the interested persons. In FIG. 1 the measuring device is arranged in a closed building 64, which can only be entered through a door 63, which is lockable by means of two different locks 65 and 66, the key of lock 65 being in possession of the contractor and the key of lock 66 being in possession of the principal. Lock 66 is thus only under control of the principal and the lock 65 is only under the control of the contractor, so that the tamperable parts can only be approached by the principal and the contractor together.

The counting mechanism 56 is placed behind a transparent pane 67. Preferably the measured values can also be supplied to a calculating machine and/or a counting mechanism, placed in a locked space, as well as to an other, for example accessible, indicator or to a regulating member of the dredging installation.

According to the most reliable conventional method the quantity of soil, which is conveyed from a winplace to raise-works, is measured by means of gaugings in the barges which convey the soil from the winplace.

The method according to the invention for determining the quantity of dredging spoil to be paid also provides an attractive solution in case that, as is shown in FIG. 5, two separate ground-works 40 and 41 are performed at the same time by one contractor on behalf of two different principals.

With the particular method according to the invention the soil for the raise-works 40 and 41, which soil is sucked up by means of a win suction dredger 44, is conveyed from the winplace 42 by means of hopperbarges 43 to a suction well 45, discharged in the suction well 45, sucked up from the suction well 45 by means of a win suction dredger 46, and conveyed through a common pipe 47 to a branching 48. According to FIG. 5 two branches 49 and 51 lead from the branching 48 to the raise-works 40 and 41 respectively, in which branches 49 and 51 vertically mounted U-bends 50 and 52 respectively are incorporated with the above-described measuring device and in which branches 49 and 51 valves 53 and 54 respectively may be incorporated.

The delivered quantities of dredging spoil are now determined accurately for the two raise-works from the measured values at the U-bends 50 and 52, while the advantage is obtained that the dredging spoil is sucked up from a common suction well 45 instead of from barges which convey the soil from the winplace 42 to a barge suction dredger. With sucking dredging spoil from barges the suction process is not so continuous and cannot be performed so efficiently as with sucking up dredging spoil from a suction well.

According to FIG. 6 one U-bend 155 is incorporated in the common pipe 147 instead of two U-bends in the branches. On this U-bend 155 a measuring device such as that shown in FIG. 1 is mounted, which measuring device, however, is provided with two counting mechanisms 56a and 56b, to which the calculating machine 125 is selectively connected by means of a switch 57. The switch 57 is controlled by means of a pneumatic ram 58 which is positioned by a control member 59, under the influence of the same air source 60 as that supplied to the rams 61 and 62, which are coupled in such a manner with the control member 59, that the one valve 153 is closed and the other valve 154 is open and vice versa, whereby the counting mechanisms 56a and 56b respectively are connected to the output of the calculating machine, so that the counting mechanism 56a registers the quantity of dredging spoil conveyed to the ground-work 141 and the counting mechanism 56b registers the quantity of dredging spoil to the ground-work 140.

What I claim is:

1. A method of determining the quantity of dredging spoil to be paid in a flow of a suspension of dredging spoil and water during the performance of ground works, comprising the steps of guiding the suspension substantially vertically upwards along a first flow and substantially vertically downwards along a second flow section, deriving the concentration of dredging spoil in the suspension by measuring at least one pressure difference between two vertically spaced points of the first flow section and at least one pressure difference between two vertically spaced points of the second flow section, sensing the output velocity of the flow, and integrating the product of the value derived from the at least two mentioned pressure differences and the flow velocity over the time during which said dredging spoil is conveyed.

2. The method according to claim 1, further comprising the step of securing the parts of the pressure difference and velocity measuring device against tampering by unauthorized personnel.

3. A method for the simultaneous removal of dredging spoil from at least two ground-works, wherein the quantities of dredging spoil of said two ground-works are conveyed along a common section and along a separate section, whereby at least one of the two quantities of dredging spoil is measured at its separate section by applying the method according to claim 1.

4. A measuring apparatus for determining the cost for removing a quantity of dredging spoil comprising means for conveying the quantity of dredging spoil through a pipe during the performance of ground work, said pipe including a first pipe fraction which conveys the flow substantially vertically upwards and a second pipe fraction which conveys the flow substantially vertically downwards, pressure sensing means disposed at said first and second pipe fractions for sensing the pressure differential at vertically spaced points on said first and second pipe fractions, means for measuring the flow velocity of the suspension flowing through said pipe, means coupled to said pressure sensing means and said velocity measuring means for forming the product of the convey concentration derived from the pressure differences in the two pipe fractions by the flow velocity, and means coupled to said product forming means for integrating the product of convey concentration and flow velocity over the convey time.

5. The measuring apparatus according to claim 4, wherein said product forming means and said integrating means are placed in a locked space.

6. The measuring apparatus according to claim 5, wherein the locked space is lockable by means of two different keys.

7. The measuring apparatus according to claim 4, in which said first and second pipe fractions are of equal lengths.

8. The measuring apparatus accoding to claim 4, wherein a purgative source is connected to the connections of said first and second pipe fractions via purgative conduits, and further comprising means for measuring the pressure differences in said purgative conduits.

9. The measuring apparatus according to claim 4, in which a purgative conduit debouches into a measuring point, and comprising means for measuring the pressure at said measuring point, and a pressure pick up coupled to said purgative conduit in the vicinity of its debouchment.

10. An apparatus for the performance of at least two ground-works, comprising a common pipe for conveying dredging spoil from both ground-works and at least two branches for respectively conveying dredging spoil of only one of said ground-works, wheerin a first and a second measuring fraction of a measuring apparatus according to claim 4 are incorporated in said common pipe, valve means coupling said common pipe alternatively to one of said first and second branches extending to the ground-works, and wherein the measuring apparatus comprises two counting mechanisms, of which, depending on the closed or open position of said valve means, the one or the other counting mechanism is coupled with the measuring device, when the one or the other of the two branches respectively are connected with said common pipe.

References Cited

UNITED STATES PATENTS

| | | | |
|---|---|---|---|
| 1,697,867 | 1/1929 | Haultain | 73—438 |
| 2,287,027 | 6/1942 | Cummins, Jr. | 73—438 |
| 2,768,529 | 10/1956 | Hagler, Sr. | 73—438 |
| 3,175,403 | 3/1965 | Nelson | 73—438 |
| 3,473,401 | 10/1969 | Fajans et al. | 73—438 |

FOREIGN PATENTS

| | | | |
|---|---|---|---|
| 1,083,782 | 6/1954 | France | 73—438 |

LOUIS R. PRINCE, Primary Examiner

J. W. ROSKOS, Assistant Examiner

U.S. Cl. X.R.

73—438